United States Patent [19]
Ghiran et al.

[11] Patent Number: 5,941,112
[45] Date of Patent: Aug. 24, 1999

[54] METHOD AND APPARATUS FOR HYDROTRIMMING AND HYDROSHEARING

[75] Inventors: Mike Mircea Ghiran, Lake Orion; Sanjay Mahasukhlal Shah, Troy; Reginald Clark Joyner, Canton, all of Mich.

[73] Assignee: General Motors Corporation, Detroit, Mich.

[21] Appl. No.: 09/197,879

[22] Filed: Nov. 23, 1998

[51] Int. Cl.⁶ .................................................. B21D 28/28
[52] U.S. Cl. ........................................ 72/55; 83/53; 83/54
[58] Field of Search .............................. 72/54, 55; 83/22, 83/53, 54

[56] References Cited

U.S. PATENT DOCUMENTS

| | | | |
|---|---|---|---|
| 3,383,888 | 5/1968 | Aschberger | 72/55 |
| 3,786,662 | 1/1974 | Roth | 72/55 |
| 4,989,482 | 2/1991 | Mason | 83/54 |
| 5,398,533 | 3/1995 | Shimanovski et al. | 72/55 |

*Primary Examiner*—David Jones
*Attorney, Agent, or Firm*—Charles E. Leahy

[57] ABSTRACT

A tubular member is manufactured in a hydroforming and hydroshearing apparatus. A substantially right circular cylindrical workpiece is placed in a die and pressurized to hydroform a substantially rectangular tubular product. The workpiece is presheared during the pressurization period and is fully sheared during the withdrawal of a plurality of plunger members while the internal pressure is maintained. The plunger members are positioned in the die by respective power cylinders which control the withdrawal thereof.

6 Claims, 4 Drawing Sheets

METHOD AND APPARATUS FOR HYDROTRIMMING AND HYDROSHEARING

TECHNICAL FIELD

This invention relates to methods and apparatus for forming and sizing a tubular member. More particularly, this invention relates to the use of fluid pressure and die structures to hydroform a tubular member.

BACKGROUND OF THE INVENTION

Hydroforming technology is used to form various components for use in automotive vehicles such as frame members. Many frame members are tubular in shape with a rectangular cross-section. These members are shaped in a hydroform apparatus to have a generally tubular shape. After the preliminary shaping, the tube member is removed from the apparatus, usually a die, for further machining, processing or fabricating. The tube is trimmed to have the desired length in a separate operation. The length is established by laser cutting, plasma cutting or mechanical shearing outside of the hydroforming die.

These operations employ additional fixtures to accomplish the machining, processing or fabrication. The operation also requires additional handling of the tube for transportation from the hydroforming die to the shearing equipment. Both of these added requirements increase the manufacturing cost and time.

Unless the forming and the shearing operations are equal in length of time, more expense is incurred. If the shearing operation is slower, the tubes must be inventoried or the hydroforming apparatus will have down time. If the forming process is slower, the shearing apparatus will have down time.

SUMMARY OF THE INVENTION

It is an object of the present invention to provide an improved method and apparatus for hydroforming components.

In one aspect of the present invention, a tubular member is formed in a hydroforming die and sheared in the die to a desired length. In another aspect of the present invention, a plurality of die members are positioned to shear the tube member to the desired length following the hydroforming of the tube.

In yet another aspect of the present invention, the die has a plurality of retractable plungers which support a portion of the tube during hydroforming. In still another aspect of the present invention, the plungers are positioned by wedge members which are retracted following the hydroforming of the tube.

In a further aspect of the present invention, the interior of the tube remains pressurized while the wedges are withdrawn. In yet a further aspect of the present invention, the plungers are spaced a predetermined amount from the outer surface of the tube to initiate pre-shearing of the tube. In still a further aspect of the present invention, the wedges are withdrawn to permit complete shearing of the tube.

Since the tube is positioned in the die when originally formed, the length can be accurately determined. Thus the method and apparatus of the present invention result in a more accurate and efficient manufacturing process. This also results in a reduced amount of handling and refixturing, thereby saving time and tooling cost as well as improved quality.

DESCRIPTION OF AN EXEMPLARY EMBODIMENT

Figure 3A:
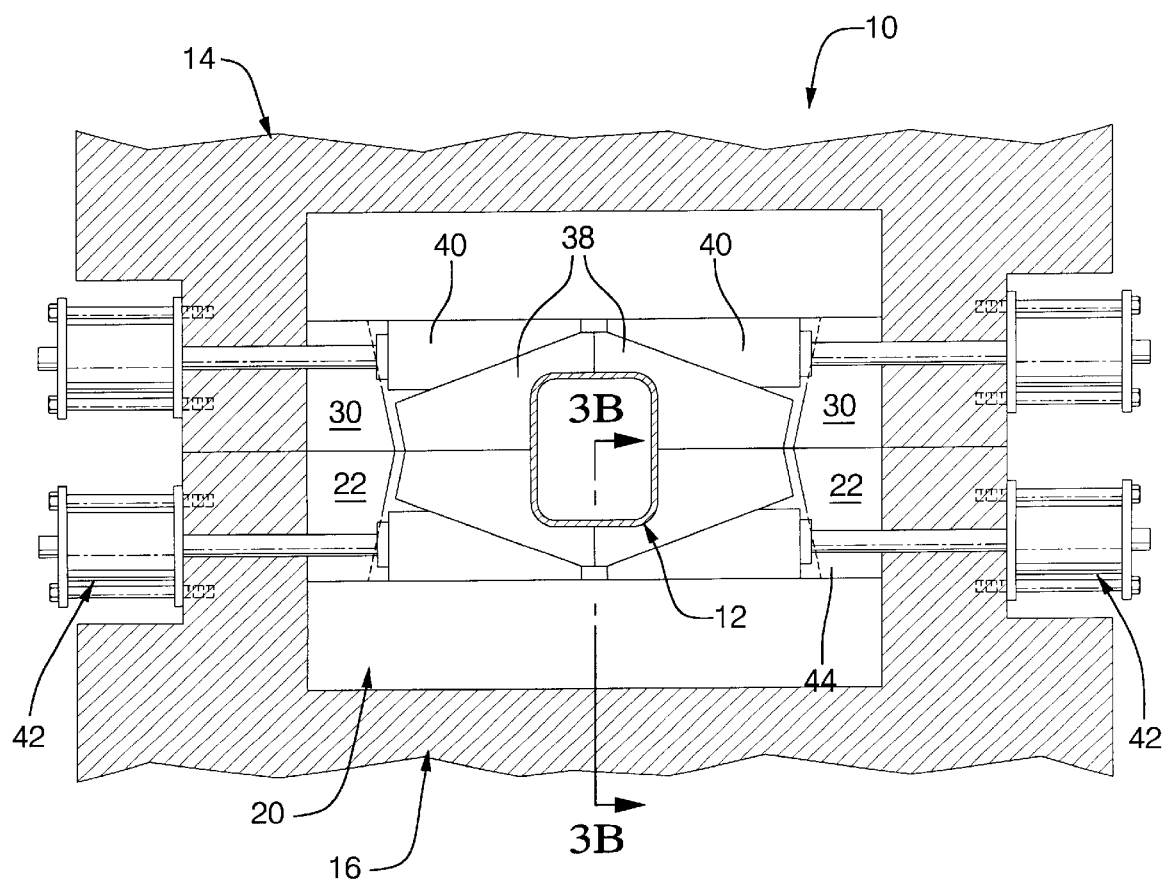
FIG. 3A is a view similar to FIG. 2A with the apparatus in the closed position after hydroforming.

Referring to the drawings wherein like characters represent the same or corresponding parts throughout the several views, there is seen a die assembly 10 in which a final product such as a tube 12 is hydroformed and hydrosheared. The die assembly 10 has an upper die 14 and a lower die 16 which can be separated to insert a workpiece or blank 18 as seen in FIG. 3. The workpiece 18 is generally tubular with an oval or circular cross-section. The particular workpiece 18 is shown with an oval cross-section. The upper die 14 and lower die 16 form a cavity 20. The lower portion of cavity 20 in the die 16, as seen in the drawings, has disposed therein two die plates 22 and two die plates 24. The die plates 22 have a sharp edge 26 which defines one-quarter of the tube end 28 of the tube 12.

The upper portion of the cavity 20 in the die 14 has two die plates 30 disposed therein, which are identical with the die plates 22, and two die plates, not shown, which are identical with the die plates 24. The die plates 30 each have a sharp edge 34 defining one-quarter of the tube end 28 similar to the sharp edges 26. The die plates 24 in the lower die 16 and their complementary die plates in die 14 have a rounded edge 36 which will permit the workpiece 18 to deform but not shear at the respective die plates.

Figure 3B:
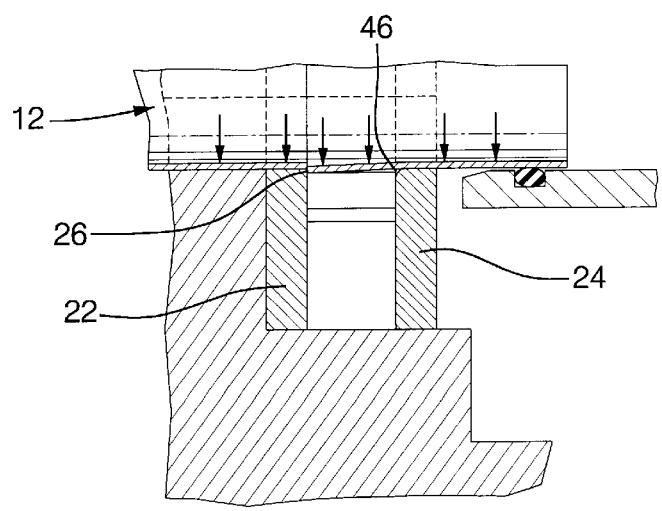
FIG. 3B is a view taken along line 3B–3B in FIG. 3A.

The lower die 16 and the upper die 14 each house a pair of support plungers 38 and a pair of wedges 40. The wedges 40 are powered reciprocally in the lower die 16 by fluid cylinders 42 through rods 44. The cylinders may be actuated by a hydraulic or pneumatic pressure source, not shown. The wedges 40 operate on the plungers 38 to force the plungers into the respective dies 14, 16. At the fully inward position of the plungers 38, as seen in FIG. 3B, a space 46 is presented between the tube 12 and the plungers 38.

Figure 2A:
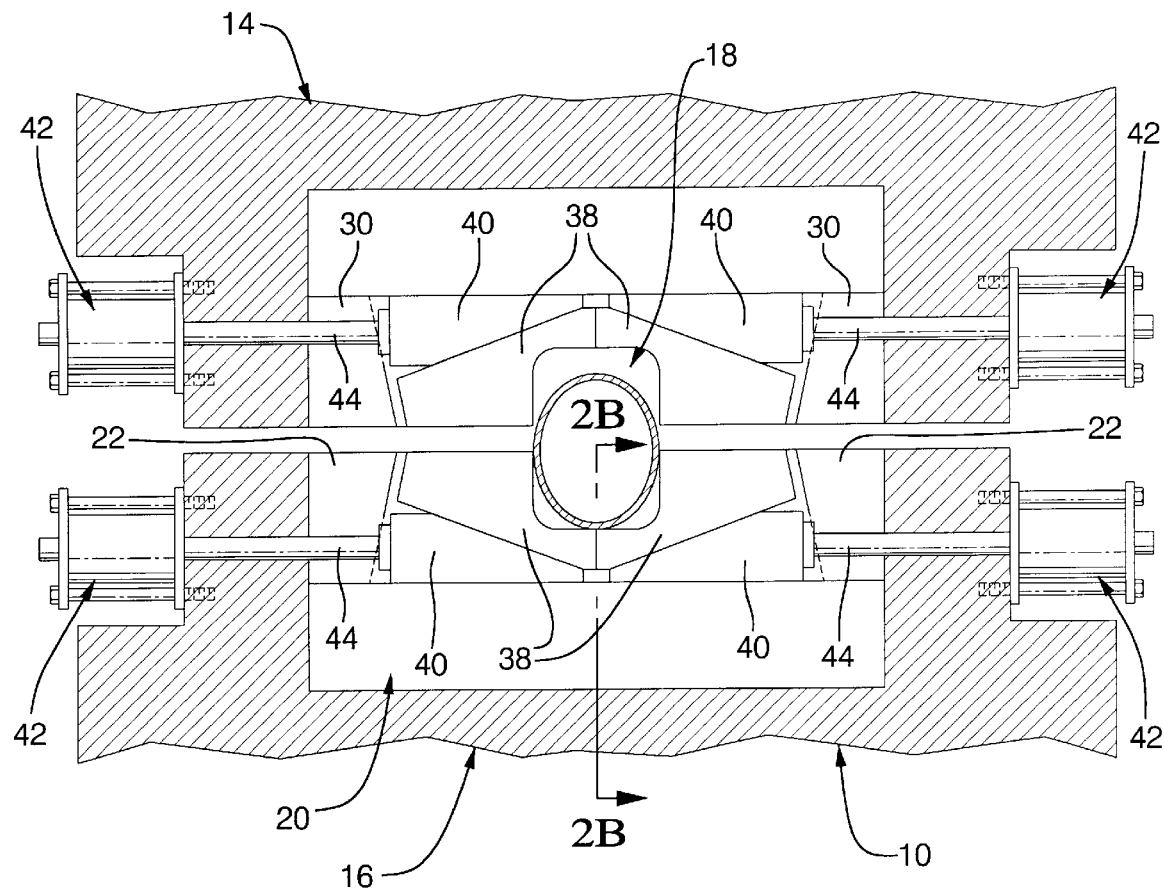
FIG. 2A is an end view partially in section of the apparatus shown in FIG. 1 prior to hydroforming.
Figure 2B:
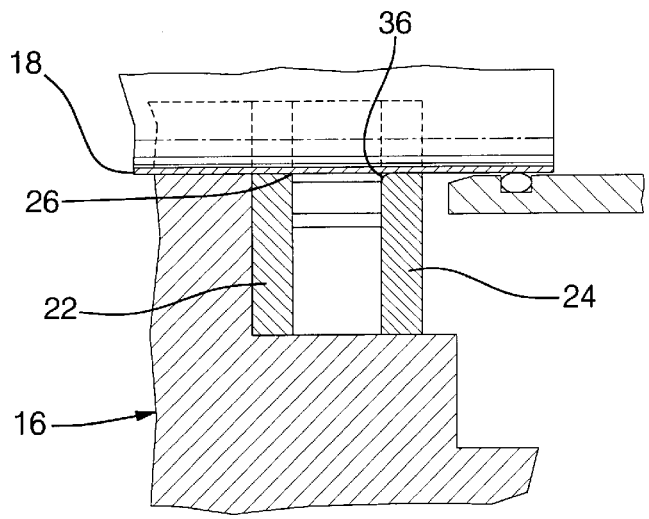
FIG. 2B is a view taken along line 2B–2B in FIG. 2A.

The workpiece 18 is inserted in the cavity 20 between the upper die 14 and the lower die 16 as seen in FIG. 2A. The die 10 is closed and a seal element 48 is placed on an end 50 of the workpiece 18. The cylinders 42 are powered into the cavity 20 such that the plungers are placed in proper position for forming the tube end 28 in cooperation with the die plates 22 and 30. The interior of the workpiece 18 is pressurized in a well-known manner to hydroform the tube 12. The seal element 48 prevents leakage of the pressurizing fluid from the workpiece 18 and tube 12. Hydroforming of tubular components is a well-known process.

With the present invention, the space 46 will permit the preshearing of the tube 12 during the pressurizing process. As seen in FIG. 3B, the workpiece 18 is partially sheared at the sharp edges 26, 34 of the die plates 22, 30 respectively and urged into abutment with the plungers 38. The smooth edges 36 permit deformation of the work-piece 18 into a supported relation with the plungers in the space 46. The space 46 is designed to be equal in dimension to approximately one-half of the thickness of the wall of the tube 12. Thus, complete shearing does not occur at this step in the hydroshearing process.

Figure 1:
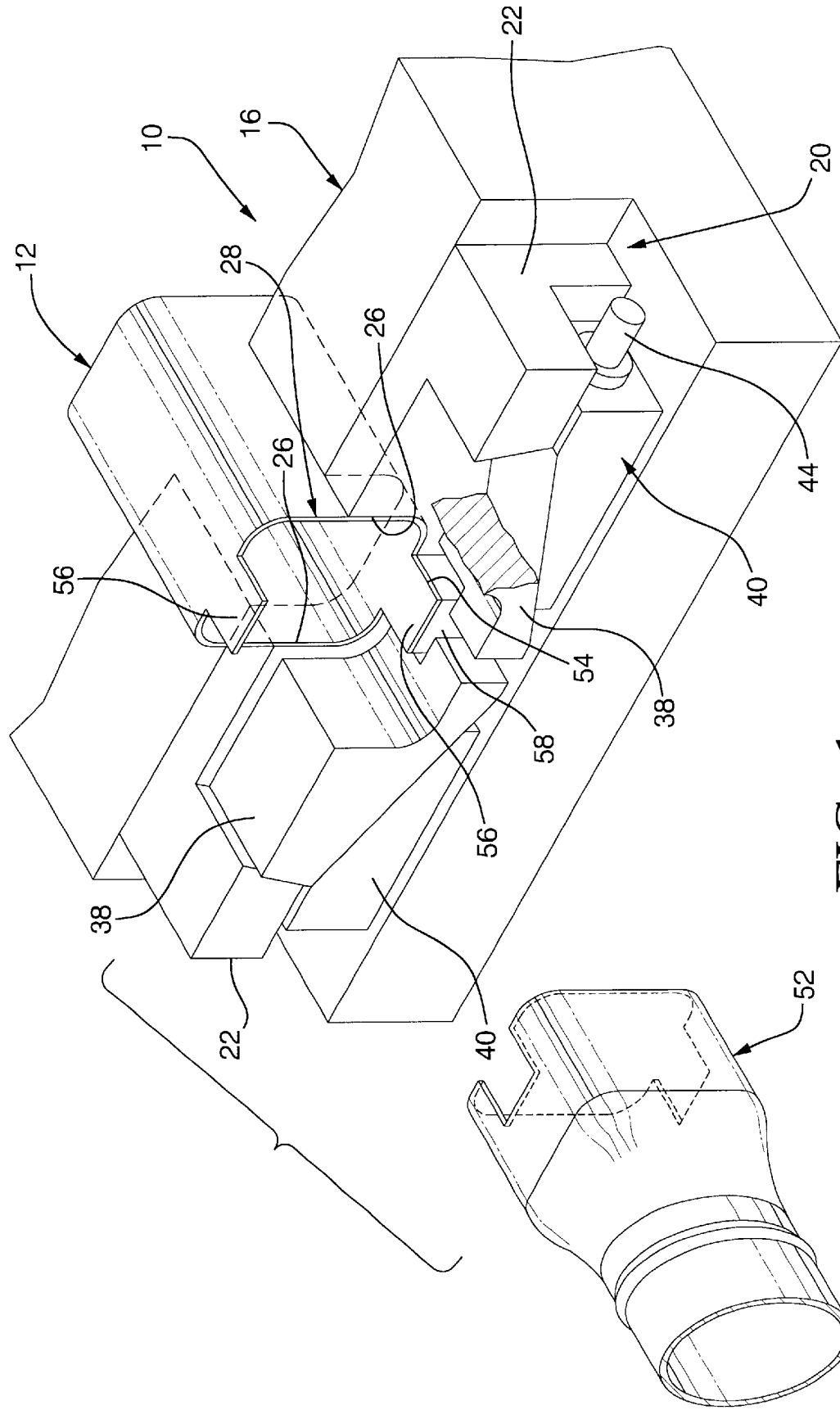
FIG. 1 is an isometric view of a portion of an apparatus incorporating the present invention.
Figure 4A:
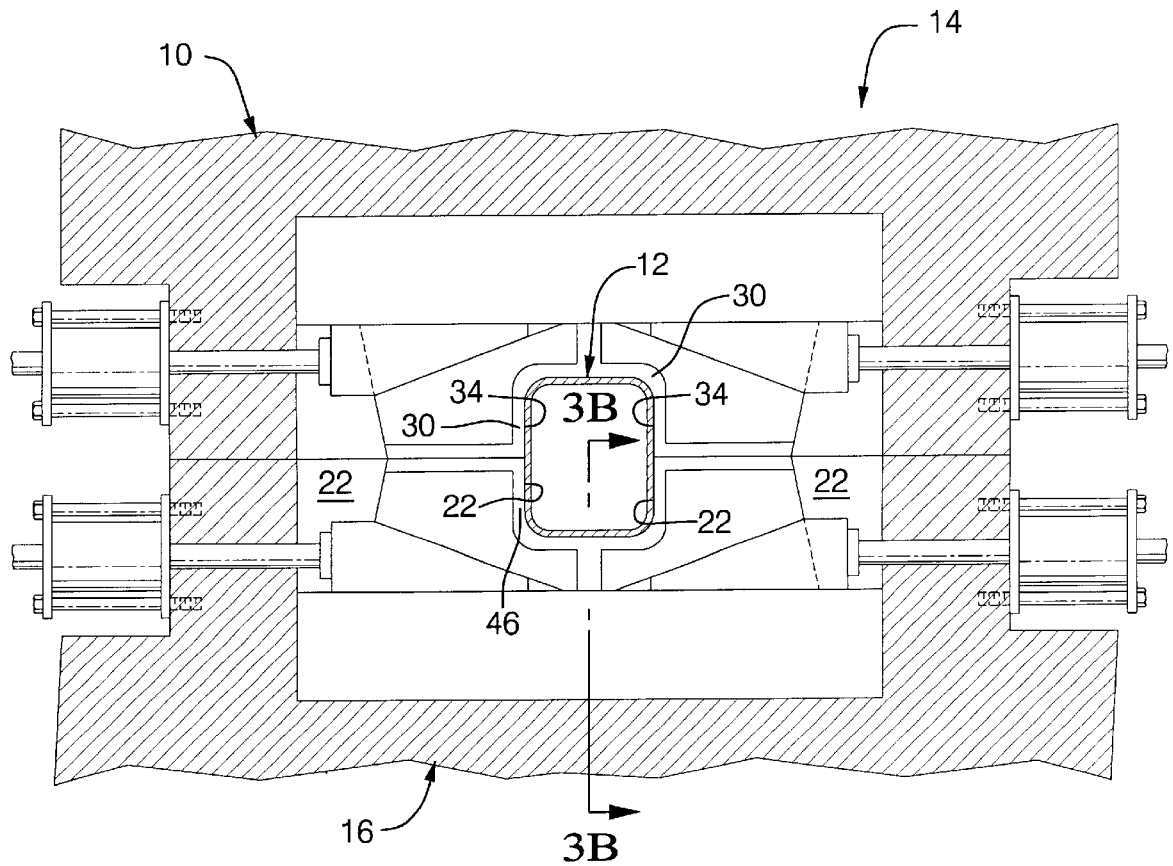
FIG. 4A is a view similar to FIG. 2A with the apparatus in a closed position and with hydroshearing completed.
Figure 4B:
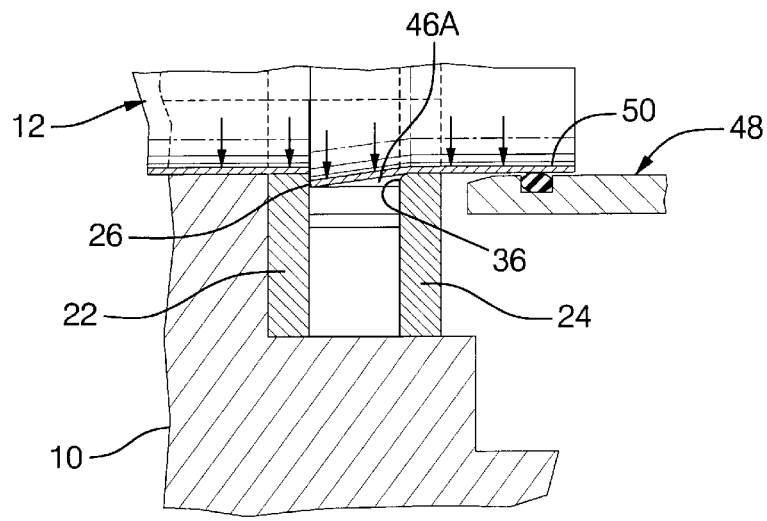
FIG. 4B is a view taken along line 4B–4B in FIG. 4A.

The wedges 40 are withdrawn a predetermined amount by the cylinders 42. The amount of withdrawal is sufficient to increase the space 46A to the size shown in FIGS. 4A and 4B. This will permit complete shearing of the end 28 of the tube 12, leaving a piece of offal or scrap 52. As seen in FIG. 1, the tube end 28 will have a sharp edge 54 with a pair of longitudinally extending tongues 56. The tongues are only provided in the example shown to assist in further assembly of the tube into a finished structure such as a frame, not shown. The tongues are shaped by an extension 58 on the lower die 16 and a similar extension, not shown, on the upper die 14. In the alternative, the tongues 56 can be formed by properly shaping the plungers 38. The contour of the end 28 con be modified to satisfy the end use without departing from the scope of the present invention.

After the hydroshearing is completed, the interior pressure of the tube is relieved and the die 10 is opened to permit removal of the tube 12. The shaping of the tube 12 is complete and further machining is not necessary. The other end, not shown, of the tube 12 is simultaneously hydroformed and hydrosheared such that the length of the tube 12 is determined in the hydroshearing process. The offal 52 can be recycled as desired.

The hydroforming and hydroshearing process has the following steps:

1) A workpiece is placed in a die structure,
2) The die structure is closed,
3) The workpiece is sealed at the ends,
4) A plurality of plungers are placed in a surrounding position to the workpiece at a predetermined distance therefrom adjacent die forming members of the die,
5) The workpiece is pressurized internally to hydroform the longitudinal shape of a final product and to preshear the end of the final product an amount sufficient to define the end structure while maintaining the fluid integrity of the workpiece,
6) Withdrawing the plungers a predetermined amount to complete the hydroshearing of the end of the workpiece to fully form the end product, and
7) Opening the die to remove the end product.

Those skilled in the art will recognize that the preshearing of the workpiece adds remarkably to the quality of the finished product. Also, it should be evident from the foregoing that the overall length determination and end shape as preformed in the single hydorforming/hydroshearing function adds value to the final product through reduced manufacturing cost.

We claim:

1. A hydroshearing apparatus comprising:

a die having a central cavity;

a first die plate means disposed in said cavity for providing a shearing edge;

a second die plate means disposed in said cavity for providing a supporting edge;

a pair of plungers slidably disposed in said cavity between said die plate means;

a pair of wedges positioned in said cavity adjacent respective ones of said plungers; and power means for moving said wedges to enforce positioning of said plunger in said cavity adjacent a workpiece in said die, said plunger being maintained at a predetermined distance from said workpiece, said workpiece being hydroformed to a finished product and presheared at said cutting edges during hydroforming and said wedges being withdrawn to permit retraction of said plungers from said predetermined positioning to allow complete shearing of said product.

2. The apparatus defined in claim 1 wherein said product has a wall thickness and said predetermined distance is less than said wall thickness.

3. The apparatus defined in claim 1 wherein said product has a wall thickness and said predetermined distance is equal to one-half of said wall thickness.

4. The apparatus defined in claim 1 wherein said product has a wall thickness and said predetermined distance is less than said wall thickness and further wherein said shearing edge and said cavity define an end form on said product.

5. A method of hydroforming and hydroshearing comprising:

placing a workpiece in a die having cutting surfaces;

closing said die;

positioning support plungers within a predetermined distance of said cutting surfaces;

hydroforming said workpiece to a finished product;

preshearing said finished product at said cutting surfaces during said hydroforming by urging said workpiece into abutting relation with at least a portion of said plungers; and withdrawing said supporting plungers from said predetermined distance to permit complete hydroshearing of said product.

6. A method of hydroforming and hydroshearing comprising:

placing a workpiece in a die structure;

closing the die structure;

sealing the workpiece at the ends thereof;

inserting a plurality of plungers in a surrounding position to the workpiece at a predetermined distance therefrom adjacent forming members of the die;

pressurizing the workpiece internally to hydroform the longitudinal shape of a final product and to preshear the end of the final product an amount sufficient to define the end structure while maintaining the fluid integrity of the workpiece;

withdrawing the plungers a predetermined amount to complete the hydroshearing of the end of the workpiece to fully form the end product; and opening the die to remove the end product.

* * * * *